United States Patent
Galperin et al.

(10) Patent No.: US 7,085,726 B1
(45) Date of Patent: Aug. 1, 2006

(54) ROBUSTNESS AND NOTIFICATIONS IN TRAVEL PLANNING SYSTEM

(75) Inventors: Gregory R. Galperin, Cambridge, MA (US); Carl G. DeMarcken, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 764 days.

(21) Appl. No.: 09/704,268

(22) Filed: Nov. 1, 2000

(51) Int. Cl.
*G06Q 10/00* (2006.01)
*G01C 21/34* (2006.01)
*G06F 17/30* (2006.01)
*G07G 17/30* (2006.01)

(52) U.S. Cl. .................. 705/5; 705/6; 705/10
(58) Field of Classification Search .............. 705/1, 705/5, 6, 7, 8, 10
See application file for complete search history.

(56) References Cited

U.S. PATENT DOCUMENTS

| | | | | |
|---|---|---|---|---|
| 5,006,985 A | * | 4/1991 | Ehret et al. | 364/413.01 |
| 5,253,166 A | * | 10/1993 | Dettelbach et al. | 705/5 |
| 5,500,941 A | * | 3/1996 | Gil | 714/38 |
| 5,948,040 A | * | 9/1999 | DeLorme et al. | 701/201 |
| 6,442,526 B1 | * | 8/2002 | Vance et al. | 705/5 |
| 6,493,637 B1 | * | 12/2002 | Steeg | 702/19 |
| 2002/0173978 A1 | * | 11/2002 | Bries et al. | 705/1 |
| 2002/0174003 A1 | * | 11/2002 | Redmann et al. | 705/8 |
| 2004/0260598 A1 | * | 12/2004 | Kumhyr et al. | 705/10 |

FOREIGN PATENT DOCUMENTS

GB 2310058 * 8/1997

OTHER PUBLICATIONS

Expedia Express, Oct. 01, 1998.*
Kallen, B. "The Late Show", Forbes, v 139, p. 166(2), Jun. 1, 1987.*
Cohen, A. "Inside Track ..Worth it", Jul. 13, 1998, Financial Times, London Ed., Dialog File 476/0009551126.*
"Airliner Observer", Aviation Week & Space Tech, Jan. 12, 1987, Dialog File 624/0026828.*

* cited by examiner

*Primary Examiner*—Dean T. Nguyen
(74) *Attorney, Agent, or Firm*—Fish & Richardson P.C.

(57) ABSTRACT

A method includes determining a travel itinerary that includes a first segment that is scheduled to arrive at a location at an arrival time and a second segment that is scheduled to depart from the location at a departure time. The method also includes deriving a probability distribution of delays in the arrival time based on an arrival statistical model of the first segment, retrieving a minimum connection time required by a traveler traveling in the first segment to connect to the second segment, and computing a likelihood that the traveler will fail to connect to the second segment based on the probability distribution of delays in the arrival time. Annotations are derived from the computed likelihood and added to the travel itinerary.

30 Claims, 7 Drawing Sheets

Probability of missing a connection, assuming no delays in departure, are given by:

$$C_{no\_departure\_delay} = \sum_{\forall t > (D-A-mct)} P_A(t)$$

150, 152, 154, 156 where:

$C_{no\_departure\_delay}$ is the probability of missing a connection;

$P_A(t)$ is the probability that the arrival of the previous flight is delayed by $t$ minutes;

$D$ is the scheduled departure time;

$A$ is the scheduled arrival time; and $mct$ is the minimum time needed to make the connection between the arriving flight and the connection flight.

FIG. 5A

Probability of missing a connection, taking into account delays in departure, are given by:

$$C_{departure\_delay} = \sum_{\forall d} \left[ P_D(d) * \sum_{\forall t > (D+d-A-mct)} P_A(t) \right]$$

where:

$C_{no\_departure\_delay}$ is the probability of missing a connection;

$P_A(t)$ is the probability that the arrival of the previous flight is delayed by $t$ minutes;

$D$ is the scheduled departure time;

$A$ is the scheduled arrival time; and $mct$ is the minimum time needed to make the connection between the arriving flight and the connection flight.

FIG. 5B

Computing Possibilities of Missed Connections

|  | D-A-mct | 0<d<30 | 30<d<60 | 60<d<90 | 90<d<120 | 120<d<150 | d>150 | cancelled |
|---|---|---|---|---|---|---|---|---|
| UA1-UA10 | 0 | (t>0) | t>30 | t>60 | t>90 | t>120 | t>150 | All t |
| UA1-UA11 | 60 | t>60 | t>90 | t>120 | t>150 | t>180 | t>210 | All t |
| UA1-UA12 | 210 | t>210 | t>240 | t>270 | t>300 | t>330 | t>360 | All t |

UA1-UA10 : (.5*.85) +(.2*.7) + (.05*.4) + (.15*.15) + (0*0.05) +(0*0.05) +.1 = 70.75%
UA1-UA11 : (.15*.4) + (.25*.15)+(.2*.05)+ (.2*.05) + (.1*.05) + (.05*.05) +.05 = 17.5%
UA1-UA12 : (.2 +.2 +.15 +.35 +.1)*.05 = 5%

Probability of Missing all three = .7075 *.175 *.05 = 0.6%

FIG. 6

ROBUSTNESS AND NOTIFICATIONS IN TRAVEL PLANNING SYSTEM

BACKGROUND

Travel planning systems, such as flight planning systems, may be used to search for itineraries that meet a set of criteria submitted, for example, by a potential traveler. The systems produce itineraries and prices by selecting suitable trips or flights from a database of travel carriers, geographic scheduling, and pricing information.

Travel planning systems may be computer programs that automate part of the process of identifying the itineraries. For example, computer travel systems may select the itineraries to ensure that the connections between any two segments meet a minimum connection time (MCT) required by a user to move from an arrival gate of the first segment to a departure gate of the second segment.

Travel segments may be delayed or cancelled with little or no notice. The delays may cause a traveler to miss a connecting flight, requiring the traveler to be re-routed on a different flight. The process of re-routing a traveler is referred to as travel schedule repair. The delays may also delay the arrival of the traveler at his ultimate destination.

SUMMARY

In general, one aspect of the invention relates to a method that includes determining a travel itinerary that includes a first segment that is scheduled to arrive at a location at an arrival time and a second segment that is scheduled to depart from the location at a departure time. The method also includes deriving a probability distribution of delays in the arrival time based on an arrival statistical model of the first segment, retrieving a minimum connection time required by a traveler traveling in the first segment to connect to the second segment, and computing a likelihood that the traveler will fail to connect to the second segment based on the probability distribution of delays in the arrival time. Annotations are derived from the computed likelihood and added to the travel itinerary.

In certain instances, the method also includes determining a probability distribution of delays in the departure time based on a departure statistical model of the first segment. The likelihood that the traveler will fail to connect to the second segment is further based on the probability distribution of delays in the departure time. The statistical models may be based on past delays in arrival and departure times.

The likelihood that the traveler will fail to connect to the second segment is compared with a threshold value. If the likelihood is greater than the threshold value, an alternate segment that the traveler may connect to if the traveler fails to connect to the second segment is determined.

The itinerary is displayed to a potential traveler.

Among other advantages, the method provides a potential traveler with information on past tardiness of a flight and allows the potential traveler to select an itinerary based on information. The method also provides alternate connections for improbable connections, thereby increasing the likelihood that a traveler will arrive with a minimum of delay and anguish.

DETAILED DESCRIPTION

Figure 1:
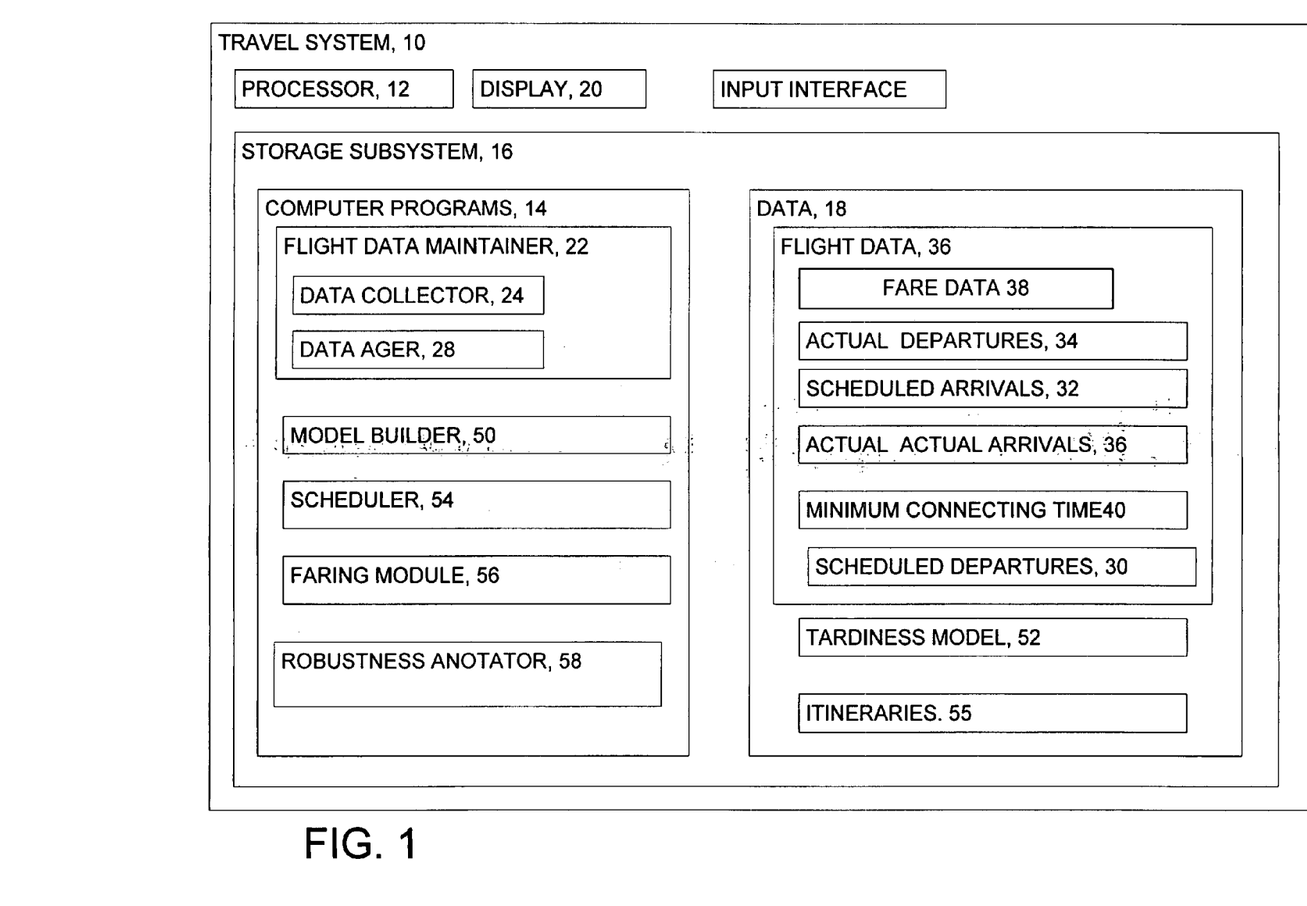
FIG. 1 is a block diagram of a travel planning system.

Referring to FIG. 1, a travel planning system 10 includes a processor 12 for executing computer programs 14 stored within a storage subsystem 16. Storage subsystem 16 is a computer readable medium that may include a memory, a floppy disk, a CDROM disk, a hard disk and so forth. The computer programs 14 generate travel data 18, some of which is displayed in a display 20 associated with the travel system 10.

Figure 2:
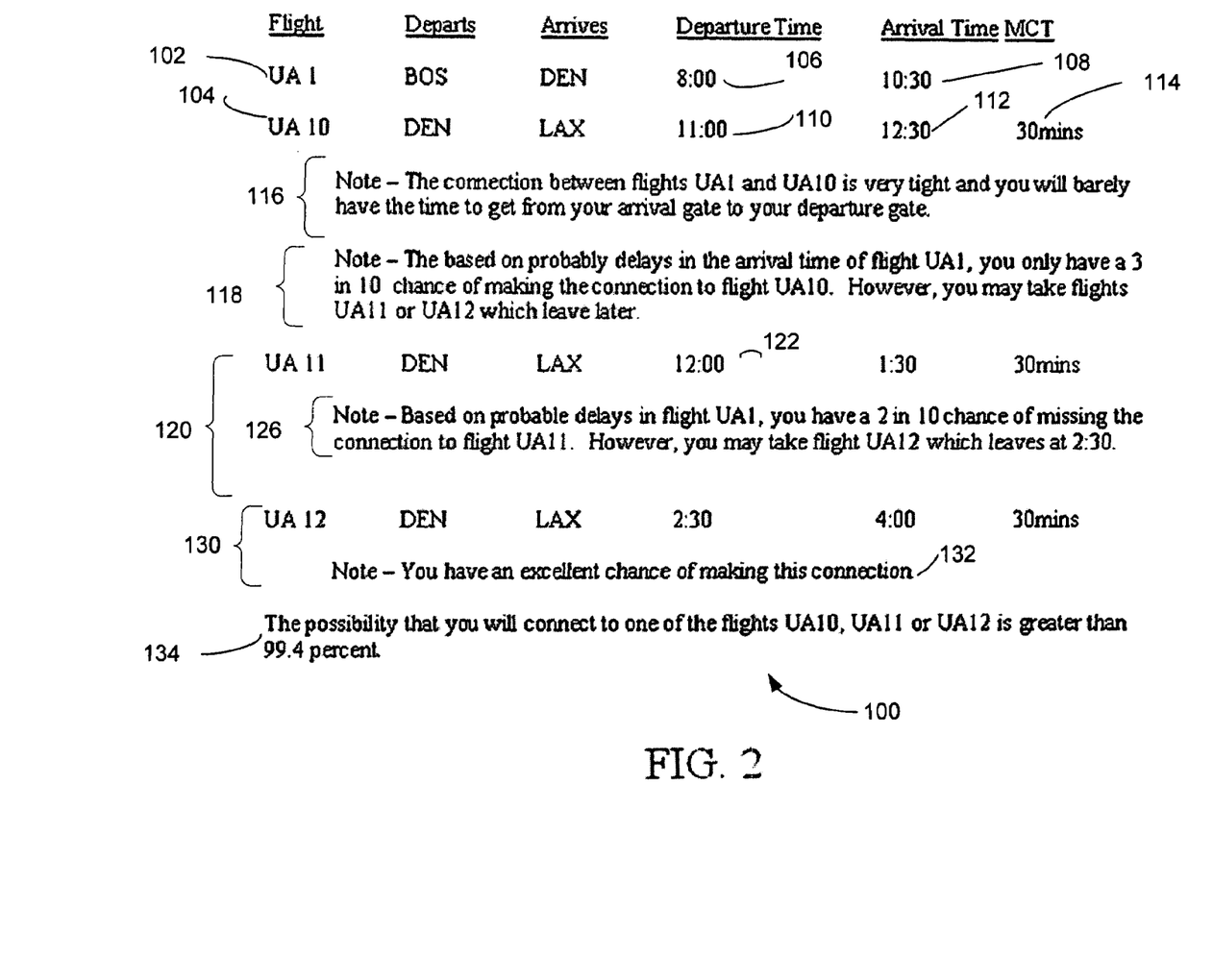
FIG. 2 shows a travel itinerary that is annotated with travel schedule robustness information by the planning system of FIG. 1.

Referring to FIG. 2, the travel system 10 is configured to generate travel itineraries such as itinerary 100. Itinerary 100 includes a first segment 102 and a second segment 104. The first segment representing a flight departing from Boston (BOS) at a departure time 106 of 8:00 and arriving at Denver (DEB) at an arrival time 108. The second segment 104 represents a connecting flight for the traveler. The second segment 104 departs from Denver (DEN) at a departure time 110 of 11:00 am and arrives in Los Angeles (LAX) at an arrival time 112 of 12:30. The traveler is in Denver for 30 minutes between the arrival time 108 of the first segment and the departure time for the second segment of the itinerary. The period that the traveler spends at a transition airport is referred to as a layover, i.e., the layover in Denver is 30 minutes.

As shown in FIG. 2, a traveler needs a minimum 114 of thirty minutes to get from the arrival gate of the first segment 102 to the departure gate of the second segment 104. This minimum time needed to make a connection between two travel segments is referred to as a minimum connection time MCT. The minimum connection time may also include the time needed for customs or immigration processing. Since the minimum connection time is exactly equal to the time that the user will be in Denver, any delay in the arrival flight will cause the user to miss the connecting flight (i.e. second segment 104).

Travel system 10 annotates the itinerary 100 with MCT information 116 informing the user that the connection is tight whenever the layover less than or equal to the minimum connection time. Travel system 10 may also be configured to annotate the itinerary 100 with the travel information when the layover is greater than the minimum connection time by an amount that is less than a threshold value, for example 30 minutes.

Travel system 10 also computes a probability that the traveler will miss the connection to the second segment 104, as will be described below. Travel system 10 annotates the itinerary 100 with probability information 118 informing the user that owing to probable delays in the arrival time 108 of the first segment 102, the user has a 3 in 10 chance of missing the connection to the second segment 104.

Since the chance of missing the segment is higher than a threshold value, such as 1 in 10, travel system 10 retrieves an alternate travel segment 120 describing an alternate flight from Denver to Los Angeles that the traveler may take if the traveler misses the flight in the second segment 104. The alternate flight is referred to as the next flight out. The alternate travel segment 120 includes a departure time 122 and an arrival time 124.

Travel system 10 further computes a probability that the traveler will miss the connection to the alternate segment 120 and annotates the alternate segment 120 with probability information 126 informing the user that owing to probable delays in the arrival time 108 of the first segment 102, the user has a 2 in 10 chance of missing the connection to the second segment 104.

Since the probability of missing the flight in alternate segment 120 is still higher than the threshold value, the server computes a second alternate segment 130 that also contains a flight from Denver to Los Angeles. The travel system 10 annotates the itinerary 100 with information 132 informing the user that the user has an excellent chance of making a connection to the second alternate flight.

Thus the travel system 10 informs the user of probable delays and missed connections in the travel itinerary 100, allowing the user to select between possible itineraries based on the information about probable missed information.

The travel system 10 also computes a cumulative probability 134 that the user will complete the itinerary without missing all the connections and displays the information to the user. The travel system 10 may be configured to only display itineraries where the cumulative probability of making the connections is above a threshold value, such as 95%. Thus the server 10 only presents desirable travel itineraries to the potential traveler.

Collecting Data

Referring again to FIG. 1, the computer programs 14 include a flight data maintainer 22, including a data collector 24 that collects flight data 26 and a data ager 28 that ages the flight data. The flight data 26 includes scheduled departure times 30, scheduled arrival times 32, actual departure times 34, and actual arrival times. The flight data 26 is collected for a large number of flights over a long period of time. Since a pattern of delays in a flight is likely to be repeated in the future, the flight data 26 is used to predict possible delays in future flights with a view to creating itineraries where a traveler is unlikely to miss a connection between one segment and another. To allow for changes in tardiness patterns over time, data ager 28 removes older information from flight data 26 and keeps the flight data current.

Every time an airplane takes off or lands, flight data maintainer 22 records information for identifying the flight (i.e., airline, flight number, origin, destination, date, scheduled departure time) along with the scheduled arrival 32, the scheduled departure time 30, the actual arrival time 36 and the actual departure time 34. Thus, flight data maintainer 22 keeps the flight data 26 current with real time flight information available from common electronic sources. The data is store in storage 16 for a long period of time, such as a year, to ensure that storage 16 contains enough flight data 26 to predict future tardiness of flights.

Flight data maintainer 22 also collects other flight data such as pricing information or fare data and minimum connecting times between any two flight segments.

Building tardiness distribution model.

Model builder 50 builds a tardiness distribution model 52, which captures simple historical statistics of flight tardiness. The model 52 is used to predict future tardiness of flights. The predictions of tardiness are then used to generate robust itineraries where a traveler is unlikely to miss a connection to a connecting flight due to a delay in the flight that the traveler is arriving in.

The tardiness model 52 captures information extracted by the model builder 50 about probable discrepancies between actual 34, 36 and scheduled 30, 32 flight times for each flight. The tardiness model 52 represents a probability distribution that indicates how likely a departure or arrival of particular flight is likely to be delayed by any number of minutes.

A simple version of tardiness model 52 includes a submodel for departure delays that is separate from another sub-model for arrival delays. However, since a flight that has a delayed departure time is also likely to have a delayed arrival time, the simple model may not capture the relationship between departures and arrivals. Described below is a simple model where departure and arrival times are independent. The concept can be extended to a more complex model where the departure and arrival times are dependent.

Tardiness model 52 may be represented as an algebraic function for computing a probability of a given delay. Such an algebraic function may be derived by fitting a curve to the statistical information on the frequencies and durations of past delays of a flight.

Figure 3:
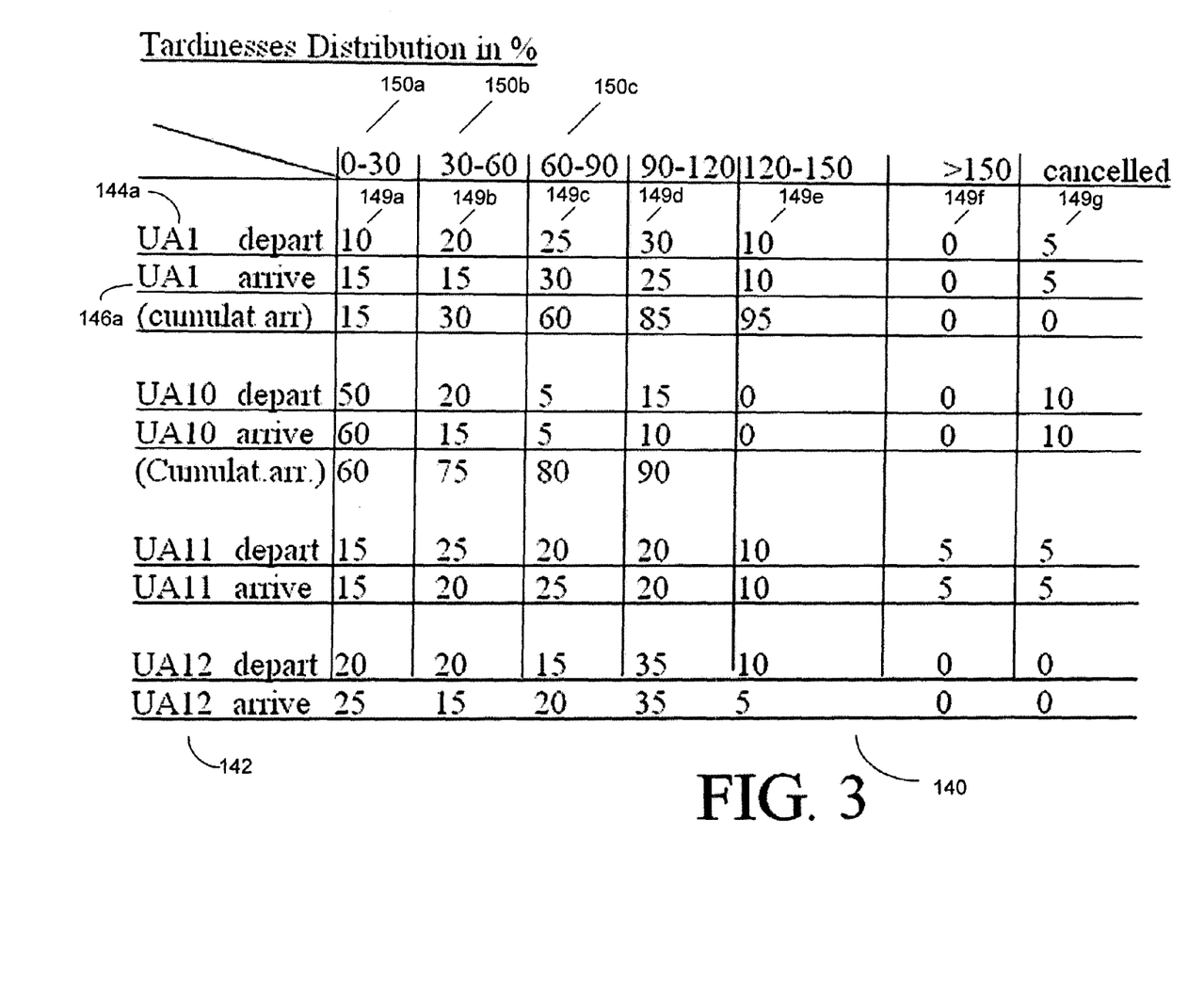
FIG. 3 is an illustration of a probability distribution of flight tardiness.

Referring also to FIG. 3, tardiness model 52 may alternatively be a table 140 indexed by the identifying flight information, such as a flight identifier 142. An actual tardiness table may also have an airline, origin, destination, and scheduled departure time as part of the identifying information. A first row 144 of departure statistics and a second row 146b of arrival statistics represent each flight 148 in table 140. Each column in table 140 corresponds to a certain amount of delay. For example, column 150a corresponds to a delay of between zero and thirty minutes, while column 150b corresponds to a delay of between thirty and sixty minutes.

Cells 149a–149f at the intersection of a certain row and column contains a count of the number of times that the flight represented by the row has been delayed by the number of minutes represented by the column. For example, the cell 149 indicates that flight UA1 corresponding to row 144a has had its departure delayed by between zero and thirty minutes ten times. The probability that flight UA1 will, in the future, be delayed by between zero and thirty minutes can be computed by dividing the count (10) contained within the cell 149a by the sum of the counts contained within the cells 149a–149f of the same row 144a of the table. Thus, table 140 can be used to estimate the arrival or departure delay of a flight.

The delay values are grouped or quantized to represent the delays in a set of ranges. The number of groups or quanta maybe increased to increase the accuracy with which the probability information is captured. However, if the number of quanta is too high, the tardiness model 52 will occupy a lot of storage space and the travel system 10 will require more processing power and take more time to compute the probabilities of delay.

Alternatively, the tardiness model 52 may be a machine learning model such as a neural network, support vector machine, radial basis function, linear or polynomial discriminant function, exponential function, decision tree, nearest-neighbor model, classifier system, naive Bayes model, fuzzy logic model, genetic algorithm, graphical model, or Bayesian belief network which expresses a functional mapping between a possible delay for a flight and the probability of the delay. Given an identity of a flight and an amount of lateness (which may or may note be quantized into a range) the machine learning model producing a probability that the identified flight will be delayed by the specified amount.

The flight data 26 containing historical tardiness is used to fit or "train" the model 52 by adjusting parameters of the model 52 so that it predicts the historical tardiness as closely as possible. More specifically, the model builder 50 tunes the parameters to minimizes the difference between the model's predicted likelihood for past delays and the actual statistical delay from the historical data. The training procedures for the different machine learning methods varies with the different type of machine learning model chosen, and can be found in a textbook on machine learning, such as "Introduction to Neural Networks," by Christopher Bishop, Oxford University Press.

The machine learning models may be easier to use and may perform better when there is little flight data.

In all the models, the choice of the information used to identify a flight influences the patterns which will be captured by the model 52. For instance, if the airline is not specified as an identifier for the flight, the model will lump similar flights by different airlines together and may not capture a propensity of one airline to be more tardy than another. Consequently, the model 52 may perform better as more information is provided to identify the different flights.

For instance, it may be useful to include whether the flight is on a weekday or weekend, as part of the identifier of the flight. Alternatively, the day of the week may be included as part of the identifier of a flight to allow the model 52 to, for example, capture information about a flight that is more likely to be late on Fridays because of weekend traffic than on other days of the week.

Further, the model builder 50 may also be provided with information about other flights that occur at about the same time as a flight being modeled. This information could be used to, for example, capture tardiness information about flights that may be, in some way, coupled to each other. For example, a single airplane may be used for a flight into an airport and shortly thereafter for a different flight out of that airport. If the flight into the airport is substantially delayed then the flight out of the airport is very likely to be about as late as the first flight. By training the model with information about the first flight into the airport, the model 52 may predict delays in the flight out of the airport.

Caution must be taken in adding input features into the model, as both the amount of data needed to train the model and the complexity of the model needed to capture the data will increase exponentially as the number of features is increased.

The model builder 50 regenerates the model 52 as the data collector 24 adds to the flight data 26. The model builder 50 is configured to give more weight (i.e. credence) to the more recent flight data 26. The model builder 50 also regenerates the model 52 when the data ager 28 removes older data from the flight data 26.

Data ager 28 performs known model validation techniques. In particular, data ager 28 determines how well a model trained on old data fits more recent data. Data ager 28 also determines how well a model trained on newer data fits the most recent data. If the model trained on the newer data fits the most recent data better, the data ager 28 deletes the older data.

Schedule Repair

Scheduler 54 responds to a request from a potential traveler for an itinerary by obtaining itineraries 55, for example, by searching through a database containing a list of flights as scheduled by the airlines. The faring module 56 determines pricing or faring information for the itinerary and adds the faring information to the itinerary.

Robustness annotator 58 computes the probabilities of making connections in the itineraries 55 based on the tardiness model 52 and annotates each of the itineraries with information about probable missed connections to bring the possibility of missing the connection to the attention of a potential traveler. The potential traveler may select a preferred itinerary from the itineraries 55 in response to the probabilities of missing connections.

If the likelihood of missing a connection to a certain segment is above a certain threshold, such as 1 in 10, robustness annotator 58 may cause invoke the scheduler 54 and cause it to determine an alternate connection for the certain segment. The alternate connection may include the next flight out of the connecting airport. The alternate segment may be annotated with information about the convenience and impact of taking the next flight out as a substitute for the passenger's originally scheduled flight. A single alternate flight can be determined for each leg, or many of them can be listed ordered by desirability.

To find the alternate segment, the scheduler 54 uses the scheduling method described in the U.S. patent application entitled "Scheduler System for Travel Planning System", Ser. No. 09/109,622, filed on Jul. 2, 1998 by Carl G. Demarcken et al. now abandoned to find the earliest-departing one-way trip with the same origin, destination, and carrier as the segment that is likely to be missed.

A more advanced version of the "next flight out" logic considers flights between the origin of the segment whose connection is likely to be missed and any airport that occurs in the itinerary after the segment that is likely to be missed, circumventing unnecessary stops. The alternate segment may be chosen to get the traveler to the ultimate destination at the earliest time possible.

Travel System Process

Figure 4A:
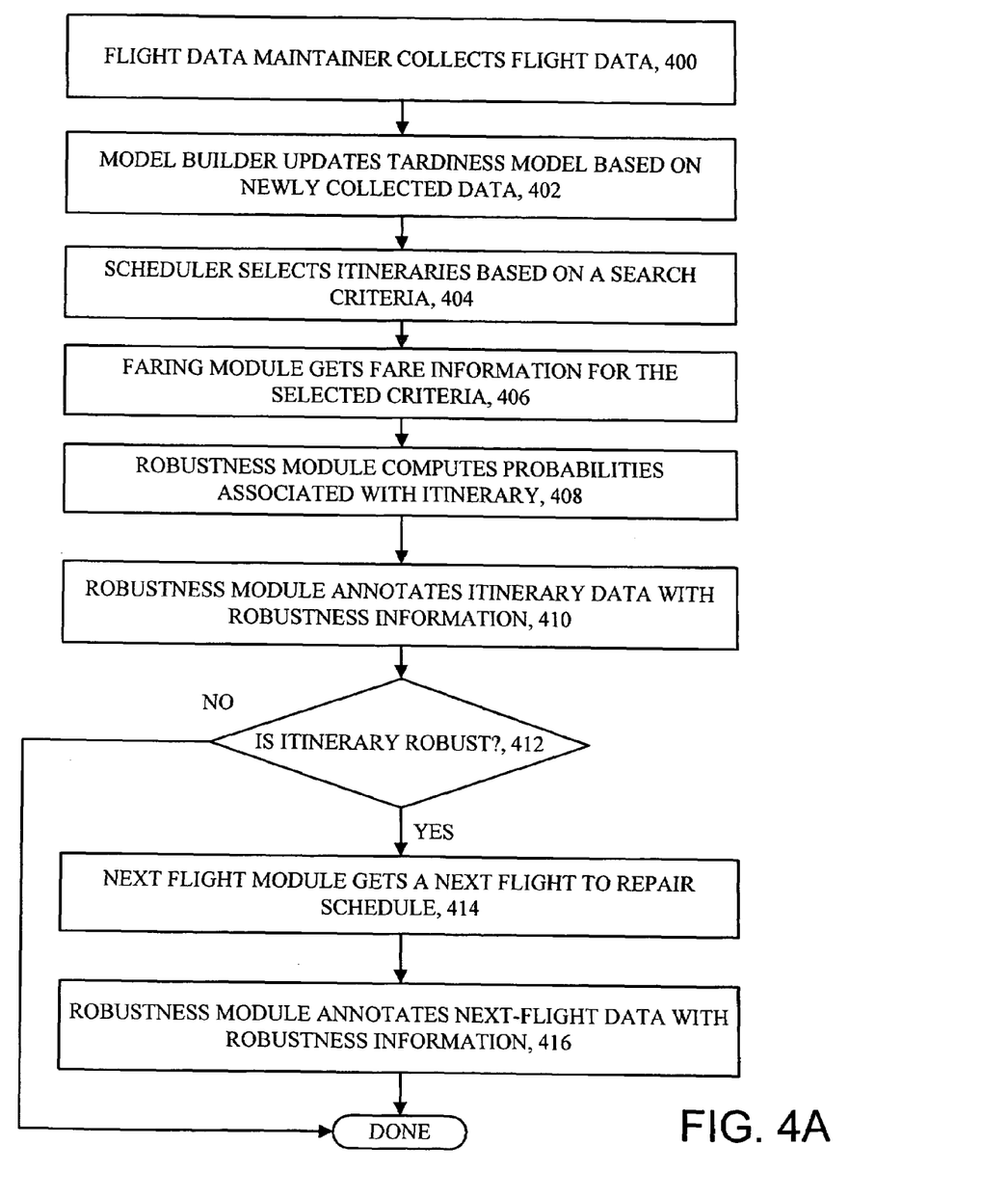
FIG. 4A is a flow chart of the process of implemented on the travel planning system of FIG. 1.

Referring to FIG. 4A, the process implemented by the server 10 begins when the flight data maintainer 22 collects 400 flight data 26, which the model builder 50 uses to update 402 the tardiness model 52.

Upon receiving search criteria for selecting itineraries 55, scheduler 54 selects (404) an itinerary based on the search criteria and faring module 56 gets (406) fare information for the selected itinerary and adds the faring information to the itinerary. Robustness annotator 58 computes (408) probabilities associated with the connections in the itinerary and uses the information to annotate (410) the itinerary with robustness information. The robustness annotator 58 uses the probability to check (412) whether the itinerary is robust. If the itinerary is robust, the robustness annotator 58 terminates the process.

Otherwise if the itinerary is not robust, robustness annotator 58 invokes scheduler 54 to get (414) the next flight data and add the data to the itinerary, repairing the itinerary. Robustness module 58 annotates the next flight data with robustness information derived from the model 52.

Figure 4B:
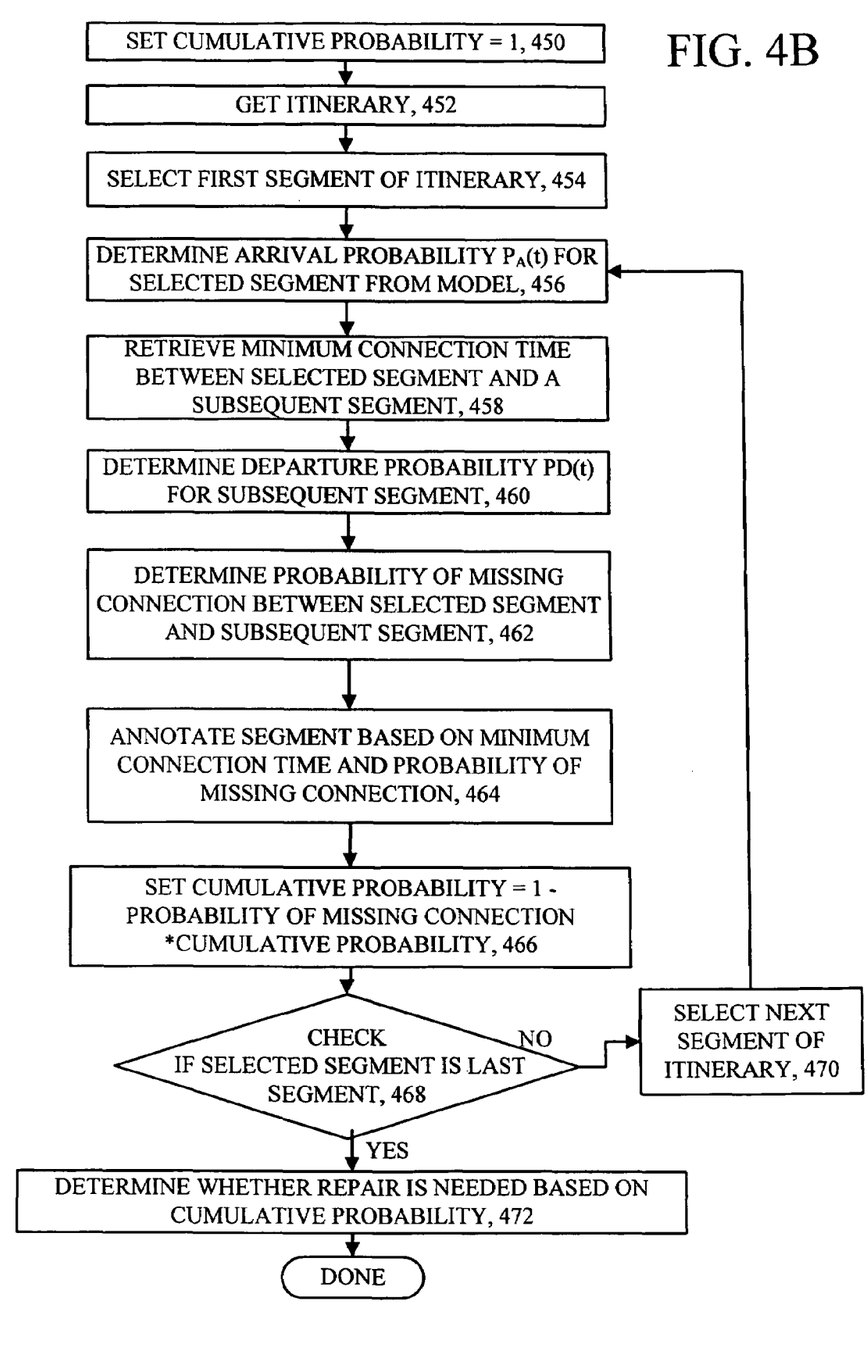
FIG. 4B is a flow chart of the process of evaluating the robustness of an itinerary and annotating the itinerary as implemented by the travel system of FIG. 1.

Referring to FIG. 4B, the process of the robustness annotator 58 will be described in detail. The robustness annotator sets (450) a cumulative property to one and then gets (452) the itinerary. The annotator 58 selects (454) the first segment of the itinerary and retrieves (456) an arrival probability distribution for the flight in the first segment of the itinerary. The annotator retrieves (458) the minimum connection time 40 between the selected segment and the subsequent segment from storage 16. The annotator also retrieves (460) a departure probability distribution for the flight in the subsequent segment of the itinerary.

The annotator 58 then determines (462) the probability of missing the connection between the selected segment and the subsequent segment based on the minimum connection time, arrival probability distribution, the departure probability distribution, a scheduled arrival time for the selected flight and a schedulded departure time for the subsequent flight, as will be described below. The annotator 58 annotates (464) the subsequent based on either the minimum connection time or the probability of missing the connection from the selected flight to the subsequent flight.

The Robustness annotator sets (466) the cumulative probability to a product of (1–the determined probability of missing the connection) and the old value of the cumulative probability.

The annotator checks (468) if the selected subsequent segment is the last segment. If it is not, the annotator selects (470) the next segment of the itinerary and repeats the process (456–468) of determining the connection probability. Otherwise, if the selected segment is the last segment, the annotator determines whether the schedule needs repair based, for example, on the value of the cumulative probability. If the value of the cumulative probability is above a threshold value, for example, 0.05, then the likelihood of missing the connections in the itinerary is too high. The robustness annotator 58 may also annotate the itinerary with the difference 14 (FIG. 2) between one and the cumulative probability. Alternatively, if the cumulative probability is too high, the travel system 10 may not show the itinerary to the prospective traveler because the itinerary is undesirable.

Computing the Probability of Missing a Connection

When a first segment and a subsequent segment are not delayed, the time that a traveler has to move from the arrival gate of a first segment to a departure gate of a subsequent gate is given by the layover, which is the difference between the scheduled departure time of the second segment and the scheduled arrival time of the first segment. For the traveler to make a connection between the two segments, the layover must be greater than the minimum connection time between the two segments. More specifically, the surplus time that the traveler has is given by the difference between the layover and the minimum connection time.

Any delays in the arrival time of the first segment reduce the surplus time. However, so long as the delay in the first segment is not greater than the surplus time, the traveler will make the connection. Consequently, for a traveler to miss a connection between the first segment and the subsequent segment the delay in arrival of the first segment must be greater than the difference between the layover time and the minimum connection time.

Figure 5A:
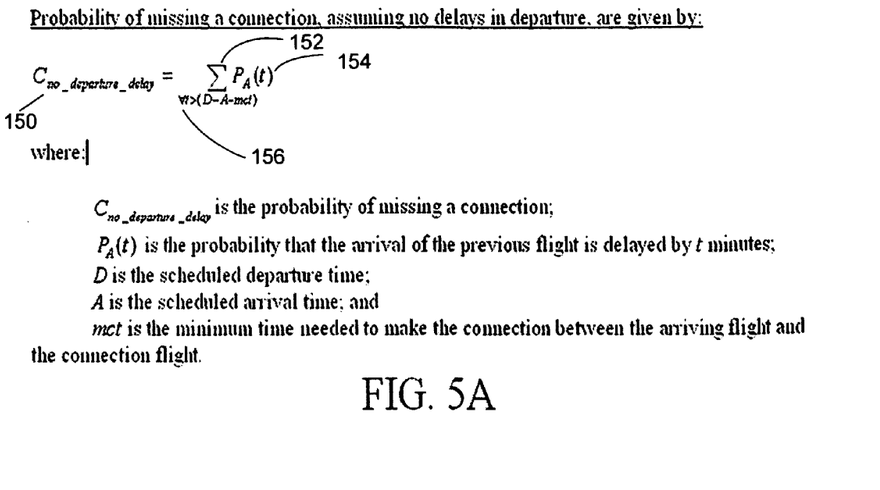
FIGS. 5A and 5B show equations for computing the probabilities of missing a connection between two segments of a travel itinerary.

Consequently, referring to FIG. 5A, a simple method of computing the probability 150 of missing the connection is given by the sum 152 of the probabilities 154 that the arrival of the flight in the first segment is delayed by an amount t 156 greater than the difference between the layover and the minimum connection time. That is:

$$C_{\text{no\_departure\_delay}} = \sum_{\forall t > (D-A-mct)} P_A(t)$$

where:

$C_{no\_departure\_delay}$ is the probability of missing a connection;

$P_A(t)$ is the probability that the arrival of the previous flight is delayed by t minutes;

D is the scheduled departure time;

A is the scheduled arrival time; and mct is the minimum time needed to make the connection between the arriving flight and the connection flight.

However, the simple technique described above does not take into account delays in the departure time of the second segment.

For example, if the departure time of the second segment is delayed more than the arrival time of the first segment, the user will make the connection between the first and the second segment irrespective of the difference between the layover and the minimum connection time.

Figure 5B:
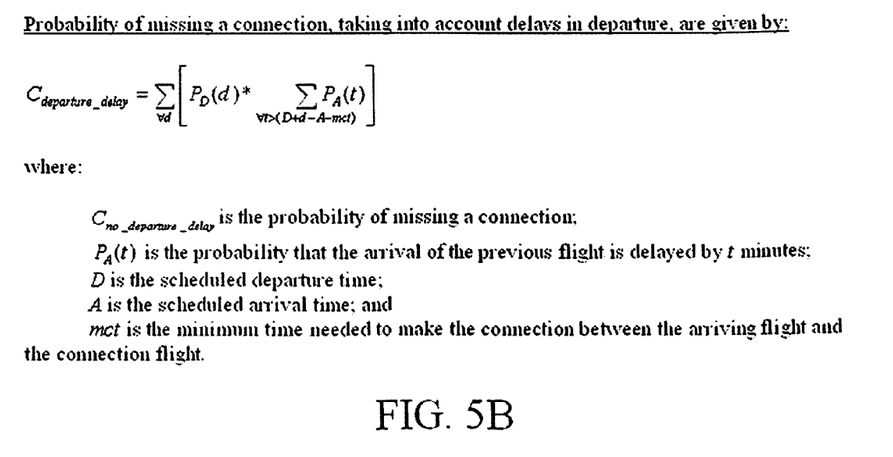
Figure 6:
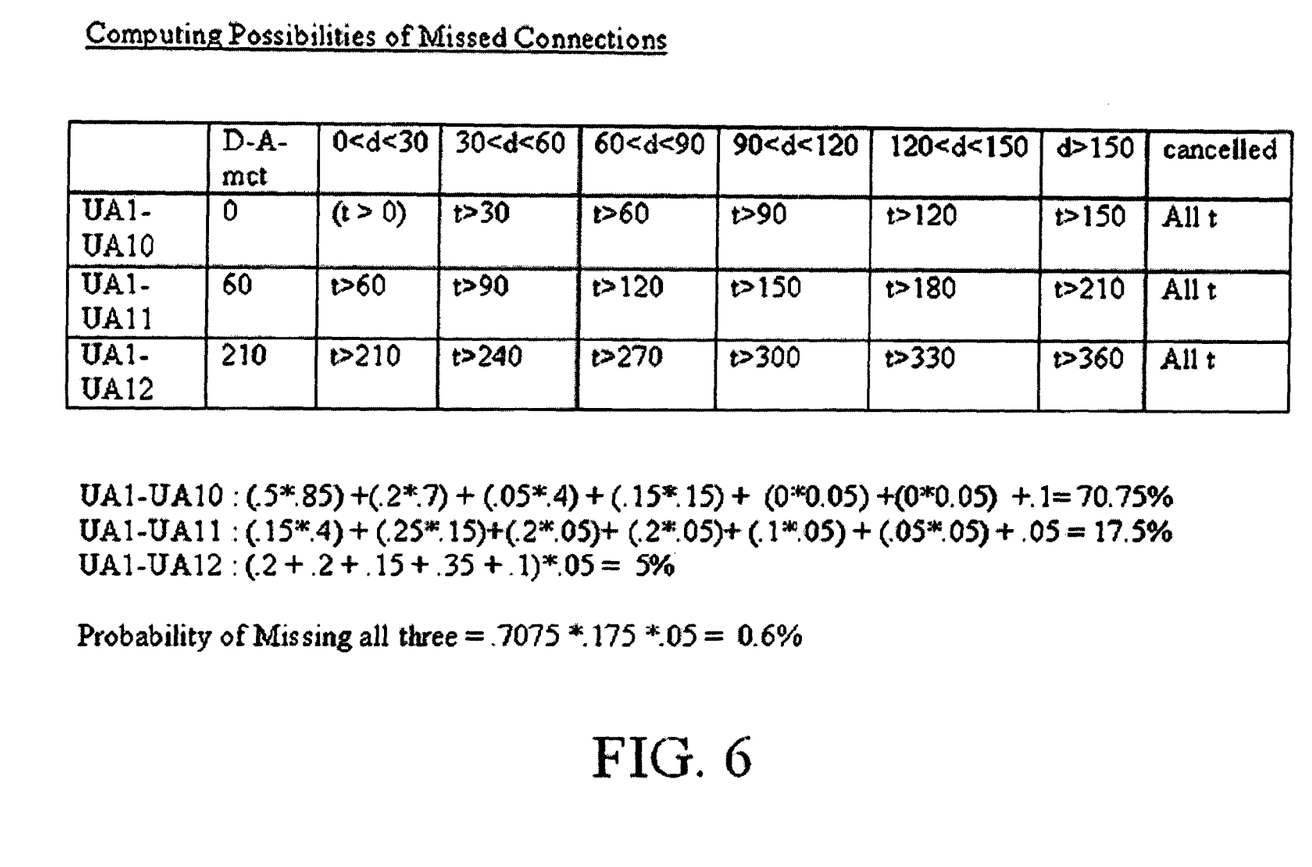
FIG. 6 shows the process of computing the probabilities using the equation of FIG. 5B.

In reality, to miss a connection, the difference between the delay in the arrival time of the first segment and the departure time of the subsequent segment must be greater than the amount t 156. A more accurate computation of the probability of missing the connection is shown in FIG. 5B. That is:

$$C_{\text{departure\_delay}} = \sum_{\forall d} \left[ P_D(d) * \sum_{\forall t > (D+d-A-mct)} P_A(t) \right]$$

where:

$C_{no\_departure\_delay}$ is the probability of missing a connection;

$P_A(t)$ is the probability that the arrival of the previous flight is delayed by t minutes;

D is the scheduled departure time;

A is the scheduled arrival time; and mct is the minimum time needed to make the connection between the arriving flight and the connection flight.

To determine the chance that any itinerary involving several segments and connections will complete successfully and need no repair (i.e. no connections are missed), the probability that the traveler will make each connection is computed then the probabilities are multiplied together to generate a cumulative probability of completing the itinerary successfully, as described above with reference to FIG. 4B them together.

The multiplication of probabilities performed above implicitly assumes that the probabilities being multiplied above are independent, that is, the tardiness of one flight does not depend on the tardiness of other flights. When using a model which captures this dependence, that is, a model whose input features include the tardiness of other flights, most often the tardiness model chosen will be causal, meaning that according to the model the tardiness of a flight depends only on factors occurring at the same time as the flight or before the flight (i.e., a plane is not late because of future events). For causal dependencies, it is sufficient to compute tardiness sorted in increasing chronological order (possibly using earlier tardiness values or distributions of tardiness output by the model as inputs to the model for a later leg), and again multiply them all together. When using a non-causal model, a summation must be made over all possible tardiness values of all possible flights simultaneously (that is, sum over the full joint probability distribution), summing the indicator function of whether that combination of tardiness amounts leads (deterministically) to a missed connection.

Displaying Notification

The information determined by the above processing logic is displayed to the end user in notifications that are displayed along with the summary of or details of a travel itinerary solution, shown in FIG. 2. These notifications are in the form of human-readable text but could be substituted with icons or some visual representation, or could even be expressed in sound or spoken language.

In the travel planning system described in U.S. patent application entitled "Travel Planning System," Ser. No. 09/109,327, filed on Jul. 2, 1998 by Carl G. Demarcken et al. now U.S. Pat. No. 6,295,521 the travel planning system attaches to each itinerary a data structure containing human-readable text messages. These attached text messages are included in the pricing graph and are also transmitted to a smart client along with the graph and schedule information. When either the server or the client processes the graph, the attached text messages can be retrieved and displayed with the itinerary as shown in FIG. 2.

Information to be inserted can be determined from the characteristics of the itinerary, such as a change of airport terminal during a connection, pointing out exceptionally long or overnight layovers at intermediate points, notifying users of a change of airline during a connection, or notifying users of interesting places to visit in either their destination or connection location. The interesting places could be advertised restaurants, hotels, car rental agencies, tourist sights, and any other local location or business.

Information to be inserted can also depend on the times of arrival and departure, such as notifying the user of events or shows which occur while the passenger is in that location. Also, the notifications can be attached to fares to highlight aspects of or restrictions on the fare such as change fees, refundability terms, or advance purchase restrictions. Finally, priorities or classifications can be attached to the messages to allow a client to select what type of messages or what level of importance to display at any given time.

In this case, the notifications embedded pertain to itinerary robustness and schedule repair as described above. The travel planning system performs the robustness checks and schedule repair computations for every itinerary and attaches to relevant itineraries a message containing the warning or notification giving the results of the computations; note that good news as well as bad may be included, e.g., the system may reassure the traveler that "there are three other flights which will get you to your destination within an hour of your currently scheduled arrival time should there be a problem with this flight," but may also warn "this is the last flight out for three days and there is a 40% chance that you will miss the connection; you might be advised to find an alternate route." In this system the types of messages and content included in them correspond directly to the types of computations and checks performed as described above, and the text itself can be automatically generated by filling in specific information about the particular itinerary and legs being evaluated into a human-readable text string describing the situation and annotated with markers indicating the location and nature of extra information to be inserted.

A number of embodiments of the invention have been described. Nevertheless, it will be understood that various modifications can be made without departing from the spirit and scope of the invention. Accordingly other embodiments are within the scope of the following claims.

What is claimed is:

1. A method executed in a computer system, the method comprising:
   determining a travel itinerary that includes a first segment that is scheduled to arrive at a first location at a first arrival time and a second segment that is scheduled to depart from the first location at a first departure time;
   computing a likelihood that a traveler will fail to connect to the second segment based on a probability distribution of delays in the first arrival time;
   deriving second segment annotations from the computed likelihood;
   adding the second segment annotations to the travel itinerary; and
   rendering the travel itinerary and the segment annotations on an output device.

2. The method of claim 1 wherein computing the likelihood that the traveler will fail to connect to the second segment is further based on the probability distribution of delays in the first departure time.

3. The method of claim 2 further comprising:
   determining the probability distribution of delays in the departure time based on a departure statistical model of the second segment.

4. The method of claim 3 further comprising:
   building the departure statistical model of the second segment based on past delays in departure times associated with the second segment.

5. The method of claim 2 further comprising:
   retrieving a minimum connection time required by a traveler traveling in the first segment to connect to the second segment; and
   computing a likelihood that the traveler will fail to connect to the second segment based on the minimum connection time.

6. The method of claim 5 wherein the likelihood that the traveler will fail to connect to the second segment is given by:

$$C = \sum_{\forall d} \left[ P_D(d) * \sum_{\forall t > (D+d-A-mct)} P_A(t) \right]$$

where:
   C is the likelihood the traveler will fail to connect;
   $P_A(t)$ is the probability that the first arrival time t minutes;
   D is the first departure time;
   A is the first arrival time; and
   mct is the minimum connection time.

7. The method of claim 1 further comprising:
   deriving the probability distribution of delays in the first arrival time based on an arrival statistical model of the first segment.

8. The method of claim 1 further comprising:
   determining whether the likelihood that the traveler will fail to connect to the second segment is greater than a threshold value;
   if the likelihood is greater than the threshold value, determining an alternate segment that the traveler may connect to if the traveler fails to connect to the second segment;
   adding the alternate segment to the itinerary; and
   rendering the alternate segment on an output device.

9. The method of claim 8 further comprising:
   computing the likelihood that the traveler will fail to connect to the alternate segment;
   deriving alternate segment annotations from the computed likelihood that the traveler will fail to connect to the alternate segment; and
   adding the alternate segment annotations to the travel itinerary.

10. The method of claim 9 further comprising:
computing the combined likelihood that the traveler will fail to connect to both the second segment and the first segment;
deriving combined annotations from the combined likelihood; and
adding the combined annotations to the travel itinerary.

11. The method of claim 7 further comprising:
building the arrival statistical model of the first segment based on past delays in arrival times associated with the first segment.

12. The method of claim 1 further comprising:
retrieving a minimum connection time required by a traveler traveling in the first segment to connect to the second segment; and
computing the likelihood that the traveler will fail to connect to the second segment based on the minimum connection time.

13. The method of claim 12 wherein computing the likelihood that the traveler will fail to connect to the second segment includes:
calculating the difference between the first departure time and the sum of the first arrival time and the minimum connection time; and
determining the probability that the delay in the first arrival time is greater than the calculated difference.

14. The method of claim 12 wherein the likelihood that the traveler will fail to connect to the second segment is given by:

$$C = \sum_{\forall t > (D-A-mct)} P_A(t)$$

where:
C is the likelihood the traveler will fail to connect;
$P_A(t)$ is the probability that the first arrival time is delayed by t minutes;
D is the first departure time;
A is the first arrival time; and
mct is the minimum connection time.

15. The method of claim 1 wherein the second segment is scheduled to arrive at a second location at a second arrival time and the travel itinerary further includes a third segment that is scheduled to depart from the second location at a second departure time; the method further comprising:
computing a likelihood that the traveler will fail to connect to the third segment based on a probability distribution of the delays in the second arrival time;
computing a composite likelihood that the traveler will not fail to connect to either the second segment or the third segment based on the computed likelihood that the traveler will fail to connect to either the second or the third segments;
deriving composite annotations based on the composite likelihood; and
adding the composite annotations to the itinerary.

16. An article comprising a machine-readable medium which stores machine-executable instructions operable to cause a machine to:
determine a travel itinerary that includes a first segment that is scheduled to arrive at a first location at a first arrival time and a second segment that is scheduled to depart from the first location at a first departure time;
compute a likelihood that a traveler will fail to connect to the second segment based on a probability distribution of delays in the first arrival time;
derive second segment annotations from the computed likelihood; and
add the second segment annotations to the travel itinerary.

17. The article of claim 16 wherein computing the likelihood that the traveler will fail to connect to the second segment is further based on the probability distribution of delays in the first departure time.

18. The article of claim 16 wherein the instructions further cause the machine to:
derive the probability distribution of delays in the first arrival time based on an arrival statistical model of the first segment.

19. The article of claim 18 wherein the instructions further cause the machine to:
build a arrival statistical model of the first segment based on past delays in arrival times associated with the first segment.

20. The article of claim 17 wherein the instructions further cause the machine to:
determine the probability distribution of delays in the departure time based on a departure statistical model of the second segment.

21. The article of claim 20 wherein the instructions further cause the machine to:
build a departure statistical model of the second segment based on past delays in departure times associated with the second segment.

22. The article of claim 17 wherein the instructions further cause the machine to:
retrieve a minimum connection time required by a traveler traveling in the first segment to connect to the second segment;
wherein computing a likelihood that the traveler will fail to connect to the second segment based on the minimum connection time.

23. The article of claim 22 wherein instructions to calculate the likelihood that the traveler will fail to connect to the second segment are given by:

$$C = \sum_{\forall d} \left[ P_D(d) * \sum_{\forall t > (D+d-A-mct)} P_A(t) \right]$$

where:
C is the likelihood the traveler will fail to connect;
$P_A(t)$ is the probability that the first arrival time t minutes;
D is the first departure time;
A is the first arrival time; and
mct is the minimum connection time.

24. The article of claim 16 wherein the instructions further cause the machine to:
determine whether the likelihood that the traveler will fail to connect to the second segment is greater than a threshold value; and if the likelihood is greater than the threshold value,
determine an alternate segment that the traveler may connect to if the traveler fails to connect to the second segment; and
add the alternate segment to the itinerary.

25. The article of claim 24 wherein the instructions further cause the machine to:

compute the likelihood that the traveler will fail to connect to the alternate segment; and derive alternate segment annotations from the computed likelihood that the traveler will fail to connect to the alternate segment; and add the alternate segment annotations to the travel itinerary.

26. The article of claim 25 wherein the instructions further cause the machine to:

compute the combined likelihood that the traveler will fail to connect to both the second segment and the first segment; and derive combined annotations from the combined likelihood; and add the combined annotations to the travel itinerary.

27. The article of claim 16 wherein the instructions further cause the machine to:

retrieve a minimum connection time required by a traveler traveling in the first segment to connect to the second segment; and compute a likelihood that the traveler will fail to connect to the second segment based on the minimum connection time.

28. The article of claim 27 wherein instructions to compute the likelihood that the traveler will fail to connect to the second segment further includes instructions to:

calculate the difference between the first departure time and the sum of the first arrival time and the minimum connection time; and determine the probability that the delay in the first arrival time is greater than the calculated difference.

29. The article of claim 27 wherein instructions to calculate the likelihood that the traveler will fail to connect to the second segment are given by:

$$C = \sum_{\forall t > (D-A-mct)} P_A(t)$$

where:

C is the likelihood the traveler will fail to connect;

$P_A(t)$ is the probability that the first arrival time is delayed by t minutes;

D is the first departure time;

A is the first arrival time; and mct is the minimum connection time.

30. The article of claim 16 wherein the second segment is scheduled to arrive at a second location at a second arrival time and the travel itinerary further includes third segment that is scheduled to depart from the second location at a second departure time, wherein the instructions further cause the machine to:

compute a likelihood that the traveler will fail to connect to the third segment based on a probability distribution of the delays in the second arrival time;

compute a composite likelihood that the traveler will not fail to connect to either the second segment or the third segment based on the computed likelihood that the traveler will fail to connect to either the second or the third segments;

derive composite annotations based on the composite likelihood; and add the composite annotations to the itinerary.

* * * * *